(12) United States Patent
Naito

(10) Patent No.: US 6,693,629 B1
(45) Date of Patent: Feb. 17, 2004

(54) IMAGE REPRODUCING APPARATUS, PROJECTOR, IMAGE REPRODUCING SYSTEM, AND INFORMATION STORING MEDIUM

(75) Inventor: Keijiro Naito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/101,329
(22) PCT Filed: Nov. 6, 1997
(86) PCT No.: PCT/JP97/04040
§ 371 (c)(1),
(2), (4) Date: Jul. 7, 1998
(87) PCT Pub. No.: WO98/20477
PCT Pub. Date: May 14, 1998

(30) Foreign Application Priority Data

Nov. 7, 1996 (JP) ............................................. 8-312768

(51) Int. Cl.[7] .................................................. G06T 1/00
(52) U.S. Cl. ...................................................... 345/418
(58) Field of Search ............................... 345/418, 213, 345/536, 563; 711/167

(56) References Cited

U.S. PATENT DOCUMENTS

| 5,440,685 | A | * | 8/1995 | Takiyama et al. | ............ | 345/536 |
| 5,926,174 | A | * | 7/1999 | Shibamiya et al. | ......... | 345/213 |
| 5,990,940 | A | * | 11/1999 | Hashimoto et al. | ......... | 348/184 |

FOREIGN PATENT DOCUMENTS

| JP | A-4-37787 | | 2/1992 | | |
| JP | 4-37787 | * | 2/1992 | ............ | G09G/1/00 |
| JP | A-6-75548 | | 3/1994 | | |
| JP | 6-75548 | * | 3/1994 | ............ | G09G/5/00 |
| JP | A-7-219486 | | 8/1995 | | |
| JP | 7-219486 | * | 8/1995 | ............ | G09G/3/36 |
| JP | A-7-334112 | | 12/1995 | | |

OTHER PUBLICATIONS

Cowart, *Mastering Windows™ 3.1 Special Edition*, pp. 151–154, 1993.*
Suko, *MVS . . . A Long History. A History of IBM's Most Powerful and Reliable Operating System*, 1999.*
IBM Corporation, "VTAM Operations" Manual, 1992.*
IBM Corporation, "VTAM Resource Definition Reference" Manual, 1992.*
IBM Corporation, "VTAM Network Implementation Guide" Manual, 1992.*
Vocabulary of Data Processing, Telecommunications, and Office Systems, p. 245. IBM Corporation, 1981.*

* cited by examiner

*Primary Examiner*—Mark Zimmerman
*Assistant Examiner*—Lance W Sealey
(74) *Attorney, Agent, or Firm*—Oliff & Berridge, PLC (57) ABSTRACT

A projector capable of setting and storing usage environment data peculiar to each user in a selectable manner is provided, thereby facilitating reduction of trouble and time of resetting when reusing. The liquid crystal projector samples and reproduces image signals input from a computer in accordance with display pixels. This liquid crystal projector selectably stores usage environment data peculiar to each user, selects the stored usage environment data the next time the liquid crystal projector is used, and reproduces image signal input based on the selected usage environment data.

25 Claims, 7 Drawing Sheets

| BRIGHTNESS | ||||||||||------- |
| CONTRAST | ||||||||||------- |
| HORIZONTAL POSITION | ||||||||||------- |
| VERTICAL POSITION | ||||||||||------- |
| SETTING | ⟶ ON |

FIG. 6A

| SETTING | EXIT ⟵ |
| TRACKING | 800 ✳ 600 |
| SYNC | +100 +100 |
| VOLUME | +30 |
| PRESET | 1 |
| LAMP | 1000 H |

FIG. 6B

| RED | ||||||||||------- |
| GREEN | ||||||||||------- |
| BLUE | ||||||||||------- |
| PICTURE | 1 ⟶ 2 |
| LANGUAGE | E ⟶ J |

IMAGE REPRODUCING APPARATUS, PROJECTOR, IMAGE REPRODUCING SYSTEM, AND INFORMATION STORING MEDIUM

BACKGROUND OF THE INVENTION

1. Field of Invention

A The present invention relates to an image reproducing apparatus, projector, image reproducing system, and information storing medium, and particularly relates to an image reproducing apparatus, projector, image reproducing system, and information storing medium wherein input image signals are sampled according to display pixels and reproduced.

2. Description of Related Art

There are known image reproducing apparatuses in which input analog image signals are sampled according to display pixels and reproduced. Examples of such image reproducing apparatuses include those using liquid crystal shutters (liquid crystal light valves), liquid crystal displays, plasma displays, and the like.

In order to use such an image reproducing apparatus and to sample and reproduce analog image signals supplied from, e.g., a computer, the input analog image signals are subjected to sampling for each pixel of the liquid crystal shutter, liquid crystal display, or plasma display which uses the input analog image signals. How the parameters for sampling of the analog image signals are set at the time of the sampling processing is a crucial factor for good image reproduction.

Particularly crucial sampling parameters are timing-related sampling parameters such as the frequency of the timing clock in horizontal scanning, the back-porch, and the phase.

The aforementioned sampling clock is output synchronously with a sampling clock for creating digital data corresponding to each pixel, e.g., in the event that one horizontal scanning period corresponds to an output cycle for 800 pixels, the frequency is set so that 800 pulses are output within the one horizontal scanning period. In the event that the frequency of the sampling clock is different, there is an offset between the optimal sampling timing for image reproduction and the actual sampling timing, resulting in reduced quality of the generated image.

Also, the term back-porch refers to the period from the output of the horizontal synchronous signal to the display of the image. When this back-porch is off, there is a problem in that the display position shifts to the right or left of that of the proper position, or the sampling timing becomes inaccurate.

Also, even in the event that the sampling clock or the back-porch is appropriate for the input image signals, when the phase between the image signal and sampling clock is offset, blurring occurs in the reproduced image. For example, problems occur, such as instead of sampling and displaying an original white color, the neighboring black color data may be sampled and displayed.

Such sampling parameters often differ one from another depending on the type of computer or the computer manufacturer, even though analog image signals have the same resolution (e.g., VGA which represents a resolution of 640 by 480 pixels).

Particularly, rapid technological advances are being made nowadays, and the resolution of the image signals output from the computer ranges from conventional VGA to SVGA and XGA types which have higher resolution, and further, even if the type thereof is the same, there often are some differences therein depending on the type of computer or the manufacturer of the computer, as mentioned above.

General-use image reproducing apparatuses such as projectors or the like need to be able to deal with various types of analog image signals provided from each type of computer, and to perform good image reproduction.

Accordingly, image reproducing apparatuses such as projectors or the like are configured so that the user sets the sampling parameters and the like output from the computer and used by the user at the time for using the projector.

However, conventional projectors have employed a configuration in which only the values set last are stored in memory as last-memory data, so when the user re-connects the projector to different computers, the adjustment items such as sampling parameters need. to be reset each time, making the equipment troublesome to use.

Particularly, liquid crystal projectors which reproduce image signals provided from a computer on a large screen for presentation to a great number of people have become widespread. During such presentations, it is common that the computer being used is different for each presenter , and it is also common for a plurality of presenters to use the same projector on different days.

However, since conventional projectors can only save setting values in the form of last-memory as described above, even in the event that the same presenter uses the same projector repeatedly, when a third party uses the projector during that time, the setting values such as the sampling parameters and so forth need to be reset each time, making the equipment troublesome to use.

SUMMARY OF THE INVENTION

The present invention has been made in light of the above problems, and it is an object thereof to set and store usage environment data peculiar to each user in a selectable manner, thereby enabling reduction of trouble and time for resetting when reusing.

In order to achieve the above objects, the image reproducing apparatus according to the present invention is an image reproducing apparatus which samples and reproduces input image signals in accordance with display pixels. The image reproducing apparatus comprises: storing means for selectably storing usage environment data peculiar to the user; and selecting means for selecting the stored usage environment data. Input image signals are reproduced based on the selected usage environment data.

Also, the information storing medium according to the present invention is an information storing medium for an image reproducing apparatus which samples and reproduces input image signals in accordance with display pixels, the information storing medium including: information for selectably setting usage environment data peculiar to the user; information for storing the set usage environment data; information for selecting the stored usage environment data; and information for using the selected usage environment data upon reproduction of the image signals.

According to the present invention, an arrangement is employed wherein the user selectably sets and stores the usage environment data peculiar to the user for the image reproducing apparatus. Accordingly, the user of the apparatus only has to perform optimal setting of the usage environment data peculiar to the user once. Thereafter, there is no need for resetting each time the apparatus is used again, thereby realizing an extremely easy to use image reproducing apparatus.

Also, the image reproducing apparatus according to the present invention may further comprise input means of input setting of the usage environment data. The storing means selectably stores a plurality of input sets of usage environment data.

Here, the input means may be provided within the image reproducing apparatus, or may be provided as external input means to an external equipment connected to the image reproducing apparatus, such as a computer, remote controller, etc.

It is preferable that the image reproducing apparatus according to the present invention be arranged such that the usage environment data is stored with identification data selectable by the user.

Thus, even when a plurality of sets of usage environment data are set and stored, the user can make reference to the identification data and can easily set and use the usage environment data peculiar to the user by means of the usage environment data being stored with identification data which identifies the user, further facilitating the usage of the apparatus.

The image reproducing apparatus according to the present invention is arranged such that the usage environment data includes sampling parameters for sampling input image signals according to display pixels.

Thus, sampling data corresponding to the computer used by the user can be set and stored as usage environment data peculiar to the user. Thus, even when the user uses the same computer for the projector repeatedly, it is possible to reproduce the image signal output from the computer as a good quality image.

It is preferable that the image reproducing apparatus according to the present invention be arranged such that sampling parameters include a timing control sampling parameter for determining the timing for performing sampling of input image signals according to display pixels.

Now, the above-mentioned timing control sampling parameters include the frequency of the timing clock in horizontal scanning, the back-porch, and the phase used for sampling digital signals according to each display pixel from the image signals, for example.

Accordingly, the above configuration allows sampling digital signals according to each display pixel from the image signals to be performed at optimal timing, thus reproducing the image in an improved manner.

Also, it is preferable that the image reproducing apparatus according to the present invention be arranged such that the sampling parameters include a sampling parameter for determining at least one of contrast and brightness when performing sampling of input image signals according to display pixels.

Such an arrangement enables image reproduction with contrast and brightness adjusted to the preferences of the user.

Also, regarding the aforementioned usage environment data peculiar to the user, in addition to the above sampling parameters, associated data may be included for setting and storing. Examples of such associated data may include such as, e.g., sound adjusting items such as volume and sound quality, the language used for display (e.g., whether Japanese is to be used or English), the display color of the screen in a blank period, the types of devices to be connected to the serial terminal, and other setting items. The arrangement may be such wherein such associated data is selectively set by the user as necessary. Accordingly, an even more easily used image reproducing apparatus can be realized.

Also, the image reproducing apparatus according to the present invention further comprises means for displaying the setting data on a display, at the time of input setting of the usage environment data.

Thus, the user can set the usage environment data while observing the display screen. Such an arrangement which allows the user to set the usage environment data while observing the display screen facilitates accurate and easy setting of the usage environment data.

Also, the image reproducing apparatus according to the present invention samples and reproduces input image signals according to display pixels of the liquid crystal display, liquid crystal shutter or plasma display, based on the selected usage environment data.

Also, the liquid crystal projector according to the present invention samples input analog image signals according to the display pixels of a liquid crystal shutter based on the selected usage environment data and reproduces the signals as a projector image, using the image reproducing apparatus according to the present invention.

Also, according to the present invention, an arrangement may be employed wherein the aforementioned usage environment data peculiar to the user is stored in storing means within the image reproducing apparatus, or an arrangement may be employed wherein the usage environment data peculiar to the user is stored within a portable information storing medium, or further, arrangements may be employed wherein the usage environment data peculiar to the user is stored in a computer device providing the image signals or in a remote controller which performs remote control of the image reproducing device.

As an aspect of such, an image reproducing system according to the present invention comprises: a computer device for outputting image signals; an image reproducing apparatus for sampling and reproducing the image signals according to display pixels of the liquid crystal display, liquid crystal shutter or plasma display, based on the selected usage environment data; and storing means for inputting and setting the usage environment data in the event that the computer device is used, and storing this data to the computer device; wherein computer device is arranged so as to output the usage environment data in a manner accompanying the image signals; and wherein the image reproducing apparatus reproduces the input image signals, using the usage environment data output from the computer device.

The above configuration allows the usage environment data to be stored in the computer device, and optimal image reproduction is performed.

Also, according to another aspect, the image reproducing system according to the present invention comprises: a computer device for outputting image signals; an image reproducing apparatus for sampling and reproducing the image signals according to display pixels of the liquid crystal display, liquid crystal shutter or plasma display, based on the selected usage environment data; a remote controller for the image reproducing apparatus; and storing means for inputting and setting the usage environment data in the event that the computer device is used, and storing this data to the remote controller; wherein the remote controller is arranged so as to output the usage environment data to the image reproducing apparatus; and wherein the image reproducing apparatus reproduces the input image signals, using the usage environment data output from the remote controller.

Such a configuration allows usage environment data to be stored in a remote controller, facilitating optimal image reproduction.

In the present invention, the image signals input to the image reproducing apparatus include all signals which are the display objects by the image reproducing apparatus, which may include still image signals or motion image signals. Also, the image signals are generally analog image signals, but may be digital image signals at times.

DETAILED DESCRIPTION OF PREFERRED EMBODIMENTS

Next, a preferred embodiment of the present invention will be described with reference to the drawings.

Figure 1:
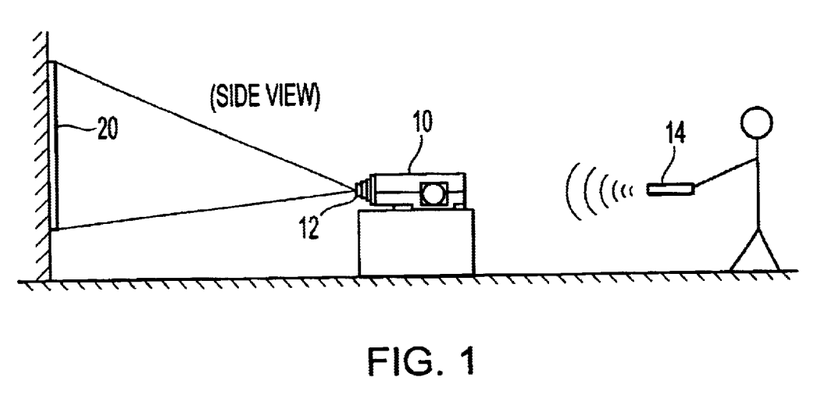
FIG. 1 is an explanatory diagram illustrating the state of use of a liquid crystal projector to which the present invention has been applied.

FIG. 1 illustrates a state in which a liquid crystal projector 10 is used as an image reproducing apparatus with a certain image being projected upon a screen 20 from the projecting opening 12 thereof.

Figure 2:
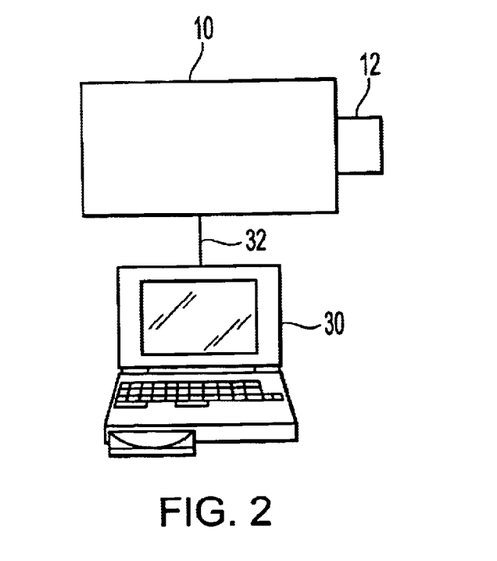
FIG. 2 is an explanatory diagram illustrating the state of connection of a liquid crystal projector which is an embodiment of the present invention to a computer.

The aforementioned liquid crystal projector 10 is, as shown in FIG. 2, connected to a computer 30 for supplying analog image signals via a communication line 32, and samples the input analog image signals according to each pixel of the liquid crystal shutter and displays a reproduced image on the screen 20 as a projector image.

Although the basic operations of the aforementioned liquid crystal projector 10 can be performed by operating various operating units provided in the main body of the projector, in the present embodiment, a remote controller 14 for the projector is used in addition to this, thus enabling remote control of the liquid crystal projector 10.

Figure 3:
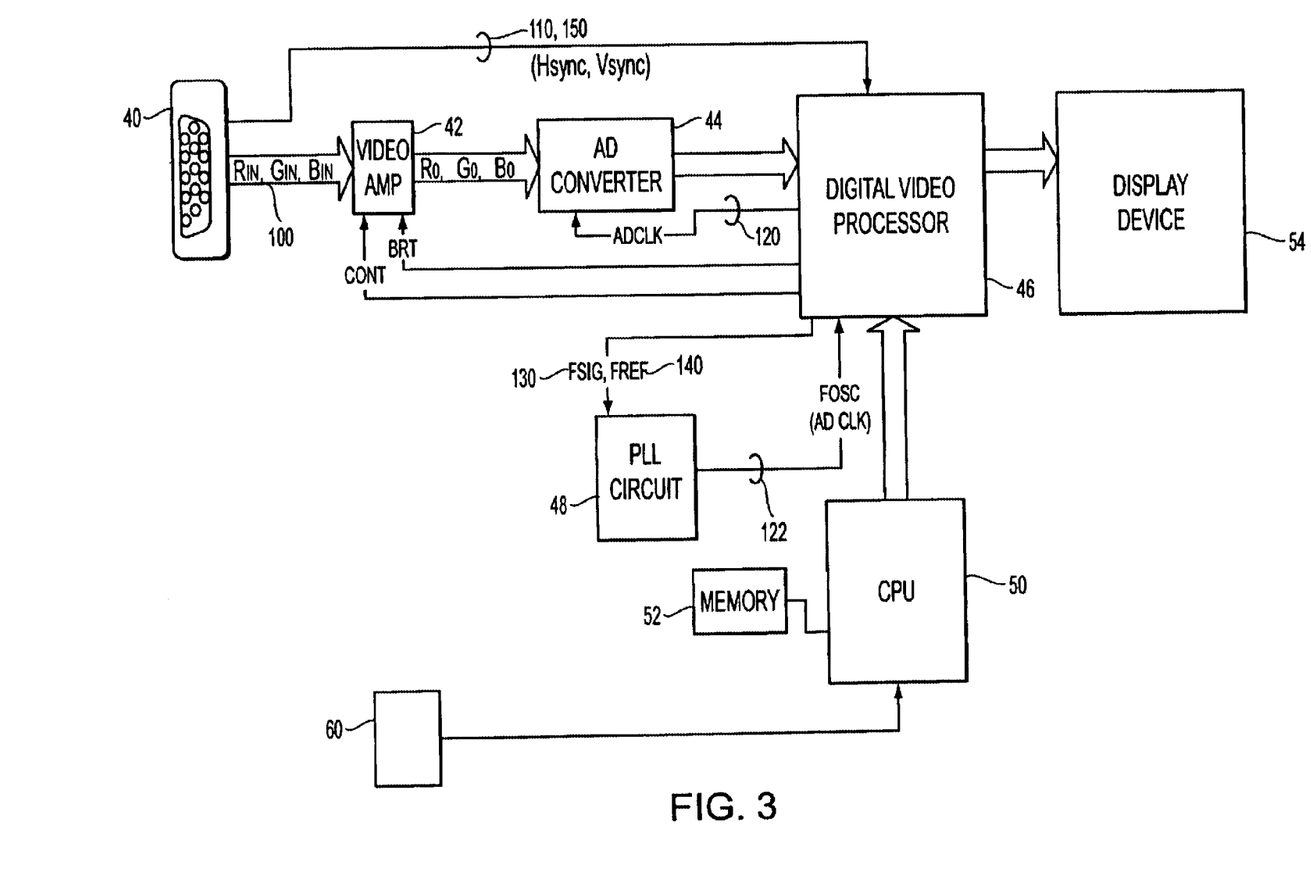
FIG. 3 is a functional block diagram of the liquid crystal projector which is an embodiment of the present invention.
Figure 4:
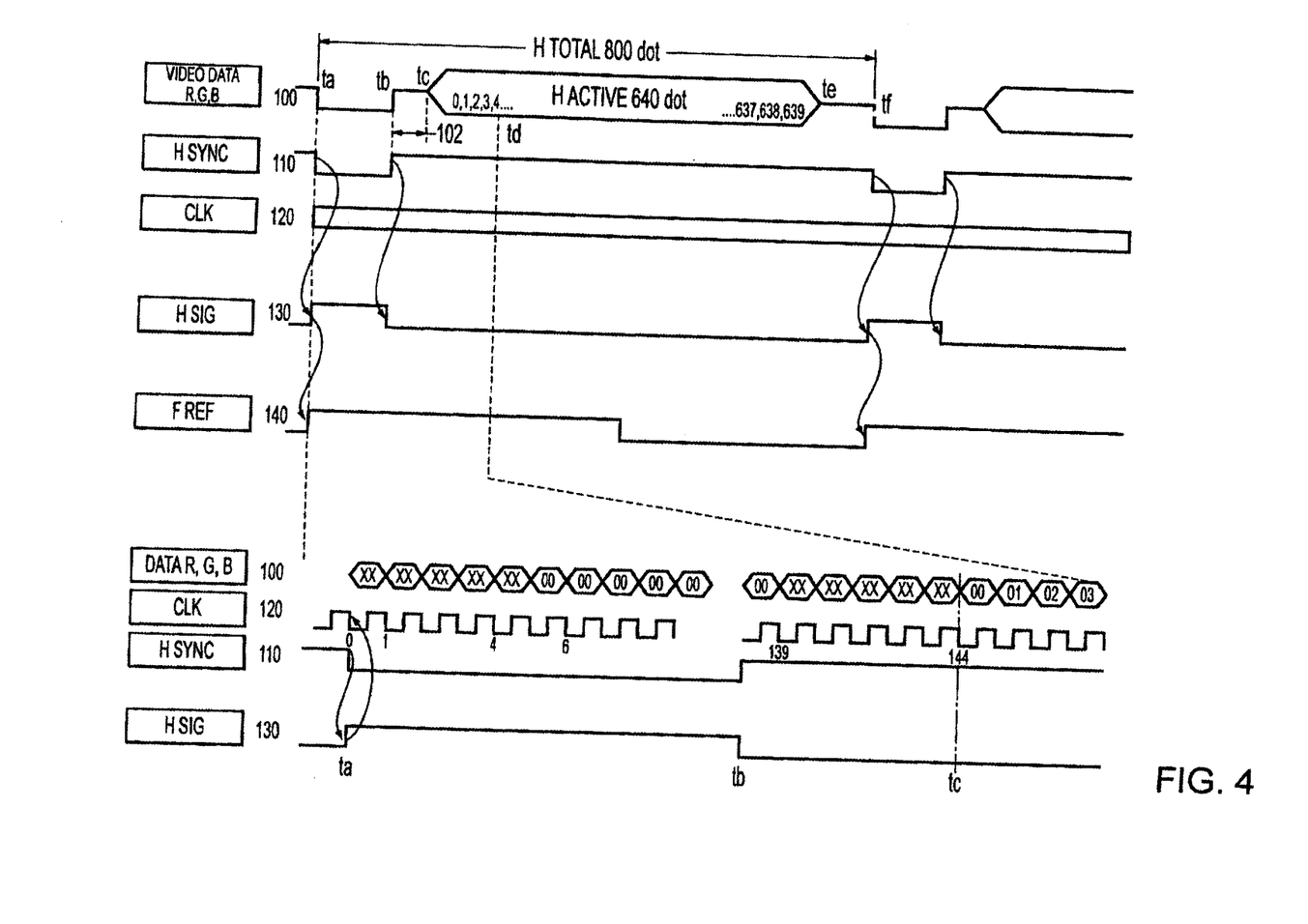
FIG. 4 is a timing chart of the functional block diagram shown in FIG. 3.

FIG. 3 shows a specific functional block diagram for the aforementioned liquid crystal projector 10. FIG. 4 shows the timing chart thereof. Incidentally, only the configurations necessary for image reproduction are shown in order to simplify the explanation, and the circuits used for reproducing sound signals and circuits used for reproduction of image signals from other video equipment are omitted.

The liquid crystal projector 10 according to the present embodiment is comprised of an input/output terminal 40, video amplifier 42, A/D converter 44, digital video processor 46, PLL circuit 48, CPU 50, memory 52, a display device 54, and an operating unit 60.

The aforementioned display device 54 is constructed so as to use three liquid crystal shutters, i.e., R, G, and B, to generate a color image to display on the screen 20 from the R, G, and B digital image signals supplied from the digital video processor 46.

In image generation using such a liquid crystal projector, there is a necessity to perform sampling and digitizing of the input analog image signals according to the pixels of the liquid crystal projector.

To this end, with the liquid crystal projector 10 according to the present invention, the horizontal synchronous signals 110 and the vertical synchronous signals 150 in the input analog image signals input to the input terminal 40 from the computer 30 are input to the digital video processor 46, and three primary colors analog image signals 100 of R, G, and B are input to the video amplifier 42.

The video amplifier 42 amplifies the three input primary colors image signals based on the contrast and brightness control signals input from the digital processor 46, and inputs the signals to the A/D converter 44.

The A/D converter 44 samples input analog image signals in a manner synchronous with the sampling pulses clock 120 supplied from the digital video processor 46, and converts the signals into digital signals according to each pixel of the liquid crystal shutter and outputs to the digital video processor 46.

Also, usage environment data peculiar to the user which has been stored by the user using the operating unit 60 as described later is stored in the aforementioned memory 52, with identification data identifiable by the user.

When the user uses the operating unit 60 to select the usage environment data corresponding to his/her own identification data, the CPU 50 outputs control signals for image reproduction to the digital video processor 46 based on the usage environment data and a certain program for reproducing the image. The usage environment data at this time includes timing-related sampling parameters such as the number of sampling clock pulses, back-porch, phase, etc., analog sampling parameters such as contrast and brightness, and associated data such as sound adjusting items, the language used for display, the display color of the screen in blank period, the types of devices to be connected to the serial terminal, and so forth.

The digital video processor 46 then outputs control signals for contrast, brightness, etc., to be output to the video amplifier, based on the aforementioned analog sampling data, and further outputs to the A/D converter 44 the sampling clock pulses 120 with the number of clock pulses and phases, optimal for the input analog image signals, based on the aforementioned timing-related sampling data.

The digital video processor 46 then performs reproduction processing of the R, G, and B image signals with optimal back-porch, based on digital signals input from the A/D converter 44, and outputs the signals to the display device 54, to be displayed on the screen 20 as an image.

Next, the construction and operation of the circuitry of the present embodiment will be made with reference to the timing chart shown in FIG. 4.

As shown in the figure, when one scanning line of analog image signals is input, the horizontal synchronous signals 110 are input first. Then, analog image signals 100 of R, G, and B are input. Here, pulses of the horizontal synchronous signal 110 are output during the period between ta and tb.

Then, analog image signals 100 for one horizontal scanning are output from the rising time of the horizontal synchronous signal 110 pulse at tb to the point tc at which a certain back-porch 102 time has elapsed. Here, analog image signals for 640 pixels are output.

The output of the analog image signals 100 ends at the timing of te, and the image output for one horizontal scanning is completed at the timing of tf.

The figure shows a timing chart for the input R, G, and B image signals being sampled by the A/D converter 44 based on the sampling clock pulses 120 and being digitized.

According to the present embodiment shown in FIG. 4, the total time for one horizontal scanning from ta through tf is time for 800 dots (pixels), corresponding to the output cycle of each pixel.

Accordingly, in order to accurately sample the digital signals from the analog image signals 100, 800 sampling clock pulses 120 need to be output between ta and tf.

FIG. 4 shows the output timing of this sampling clock pulses 120. As shown in the figure, the A/D converter 44 samples the analog image signals at the rising time of the sampling clock pulses, and coverts the signals to digital image signals.

Accordingly, in the event that the sampling frequency or the sampling phase becomes offset, accurate image reproduction cannot be performed.

Thus, the sampling clock pulses 120 output from the digital video processor 46 to the A/D converter 44 must be accurately generated in accordance with the output timing of the horizontal synchronous signals 110, and moreover, the phase thereof must be adjusted so that sampling can be performed at optimal timing.

To this end, the digital video processor 46 generates horizontal signals from the input horizontal synchronous signals 110 wherein the H and L levels are inverted, and outputs these to the PLL circuit 48. Further, the digital video processor 46 outputs frequency reference signals FREF 140 to the PLL circuit 48, at an output cycle wherein the number of sampling clock pulses corresponding to one horizontal scanning cycle of 800 dots are output from the falling point ta of the horizontal synchronous signals 110. More specifically, the signal 140 is generated so as to be output at the timing of ta, and completes one cycle of output at the point that the digital video processor 46 counts 800 sampling pulses from the timing of ta.

The PLL circuit 48 uses both such input signals 130 and 140, and as shown in FIG. 4, sets the phase thereof so that the first output pulse is completely synchronized at the falling of the horizontal synchronous signal 110 for outputting pulses 122 (see FIG. 3). That is, 800 pulses 122 are output between the timing of ta and the timing of tf.

In the event that the pulse 122 is used as the sampling pulse 120 with no change, there often is slight offset in the sampling position of the analog image signal 100. Accordingly, the CPU reads sampling data relating to phase from the memory 52, causes the digital video processor 46 to adjust the phase of the pulse 122, and outputs this to the A/D converter 44 as sampling pulses 120.

According to the above configuration, the A/D converter 44 can sample the input analog image signals at an accurate phase according to each pixel, and covert the signals into digital signals.

Now, description has already been made regarding the fact that the analog image signals output from the computer 30 are often such that the display mode differs according to the resolution, or even with the same resolution depending on the manufacturer.

For example, even with the same resolution called VGA, Company A's computers may be configured for a output cycle of 800 dots per single horizontal scanning period, while Company B's computers may be configured for an output cycle of 810 dots.

Accordingly, in the event that the frequency of the sampling clock pulses 120 is set to 800 dots per single horizontal scanning period to match Company A, accurate sampling cannot be performed with the image signals of Company B.

Also, in many cases, the value of the aforementioned back-porch 102 differs somewhat depending on the display mode or manufacturer, and accordingly, in the event that this back-porch is set to match the computers of Company A, for example, the displayed image of the image signals output from the computers of Company A will be centered on the screen 20, but the displayed image of the image signals output from the computers of Company B often will be shifted to the right or left of the screen 20, or there may be streaks in displayed image.

Furthermore, the value of the aforementioned sampling phase may also differ according to the display mode or the manufacturer.

Accordingly, the liquid crystal projector 10 according to the present embodiment is arranged such that optimal usage environment data is set for each computer 30 by the user using the operating unit 60, this being written to and stored in the memory 52. The following is a detailed description of this.

Figure 8:
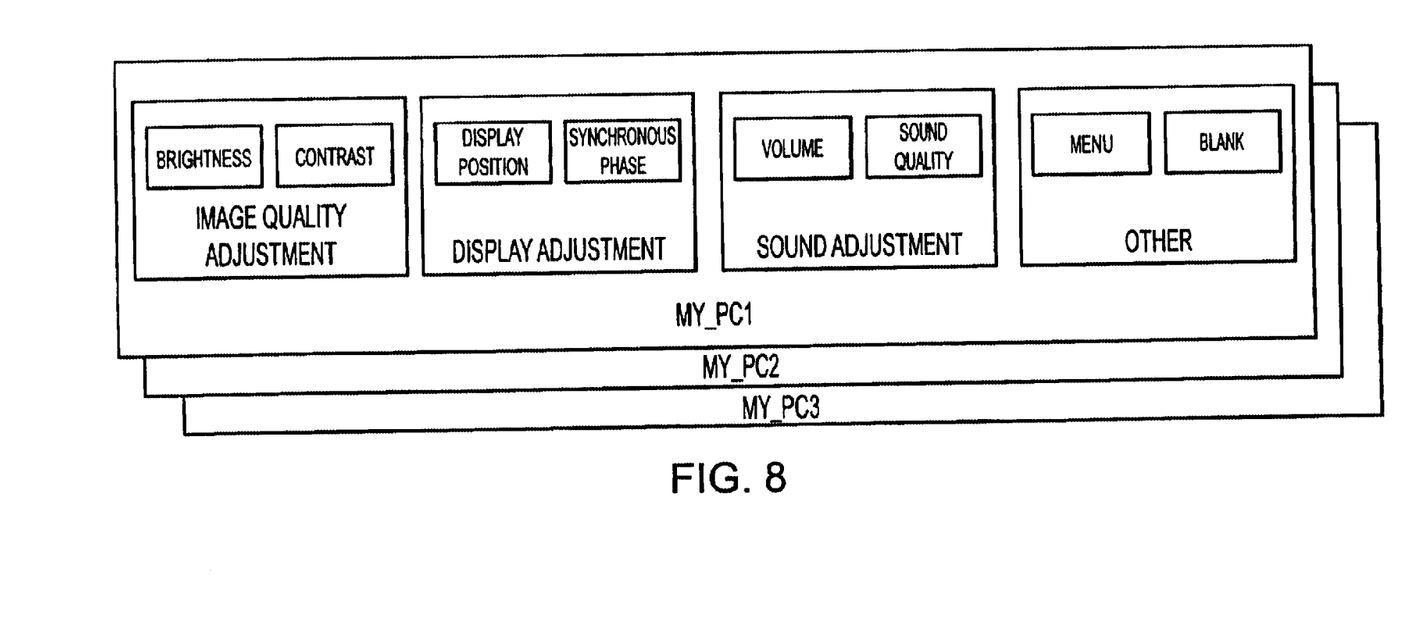
FIG. 8 is an explanatory diagram illustrating a preset screen displayed on the display.

FIG. 8 shows an example of a preset screen illustrating the contents of usage environment data already set. As shown in the figure, the setting items for the usage environment data at this time includes timing-stipulating sampling parameters such as synchronous phase (frequency of sampling clock), display position (back-porch setting for adjusting the horizontal display position, data for setting the vertical display positions, etc., analog sampling parameters such as contrast and brightness which reflect the preferences of the user, and associated data such as sound adjusting parameters like volume and sound quality, the display color of the screen in blank period, the language used for display, and so forth.

Such usage environment data can be set as three types as shown in FIG. 8, and ID numbers are automatically set for each of the sets of usage environment data, such as MYPC1, MYPC2, MYPC3, and so forth. The ID number may be arranged so that the user sets the contents thereof at will.

Figure 5:
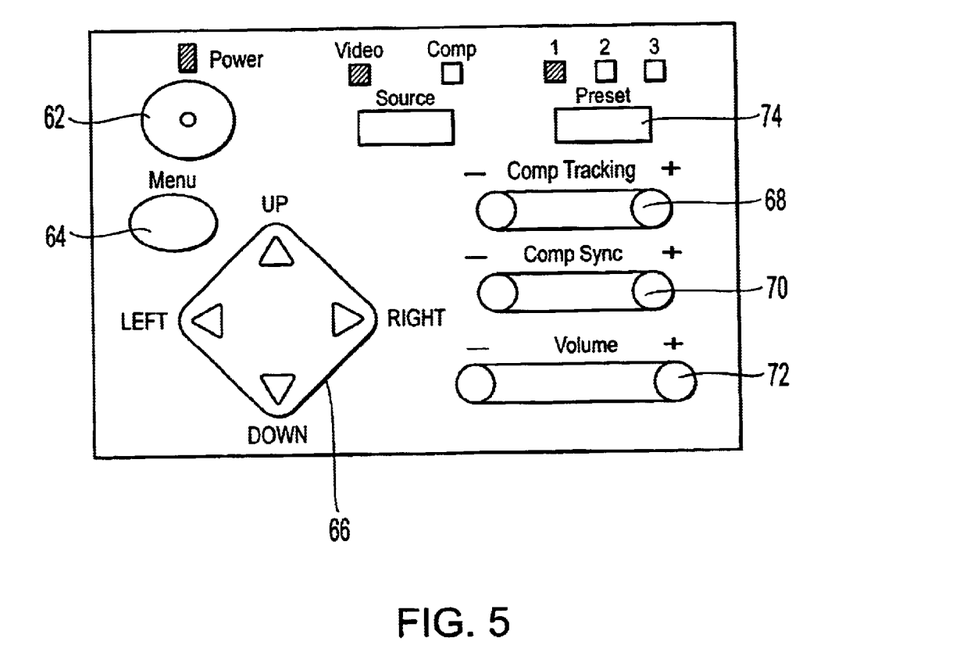
FIG. 5 is an explanatory diagram illustrating the operating unit of the liquid crystal projector according to an embodiment of the present invention.

FIG. 5 illustrates a specific key array of the operating unit 60 which is used for inputting the aforementioned usage environment data.

Figure 6A:
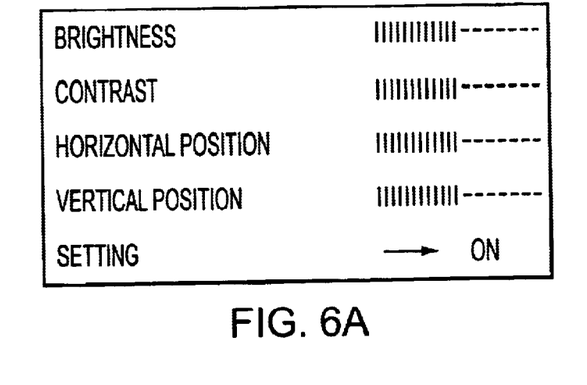
FIGS. 6A through 6C are explanatory diagrams illustrating a menu screen displayed on the display.
Figure 6B:
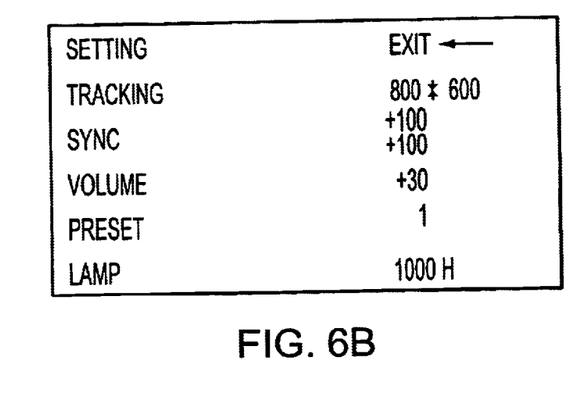
Figure 6C:
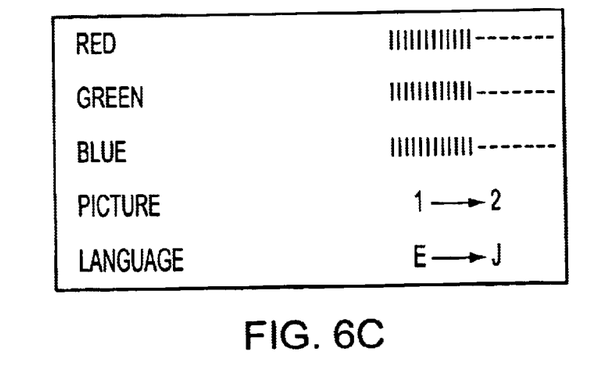

In the figure, button 62 is a electrical power button for turning the electrical power source on or off, button 64 is a menu button for instructing display of the menu screen, and operating this button causes a menu screen such as that shown in FIGS. 6A through 6C to be displayed on the screen 20.

Each time the menu button 64 is pressed, the menu screens shown in FIG. 6A, FIG. 6B, and FIG. 6C are displayed in order.

Button 66 is a button for the selection of adjusting items in the menu screen. Operating the up and down position of this button 66 enables selection of the adjusting items in the menu screen, and moving the button 66 to the left or right enables input of certain selected items.

Button 68 is a tracking adjustment button for adjusting the sampling frequency, and is used for making adjustment when vertical streaks appear on the screen. Button 70 is a synchronization adjusting button, and is used for adjusting when there is flickering, blurring or horizontal noise in the screen. Button 72 is a volume adjusting button. All of these are used for setting the adjustment items of the menu screen shown in FIG. 6B.

Button 74 is a preset button, such that when the button is pressed following completing of setting usage environment data, the data is written and stored to the memory 52 as preset data, along with the ID (identification data).

Calling of up to three types of preset data stored in the memory 52 is performed cyclically by the user operating the preset button 74. That is, first operating the preset button 74 calls up the first MYPC1 usage environment data from the CPU 50, and analog/digital conversion is performed based on this usage environment data.

Operating the preset button 74 for the second and third times calls up the MYPC2 and 3 usage environment data, and analog/digital conversion is performed accordingly.

Figure 7:
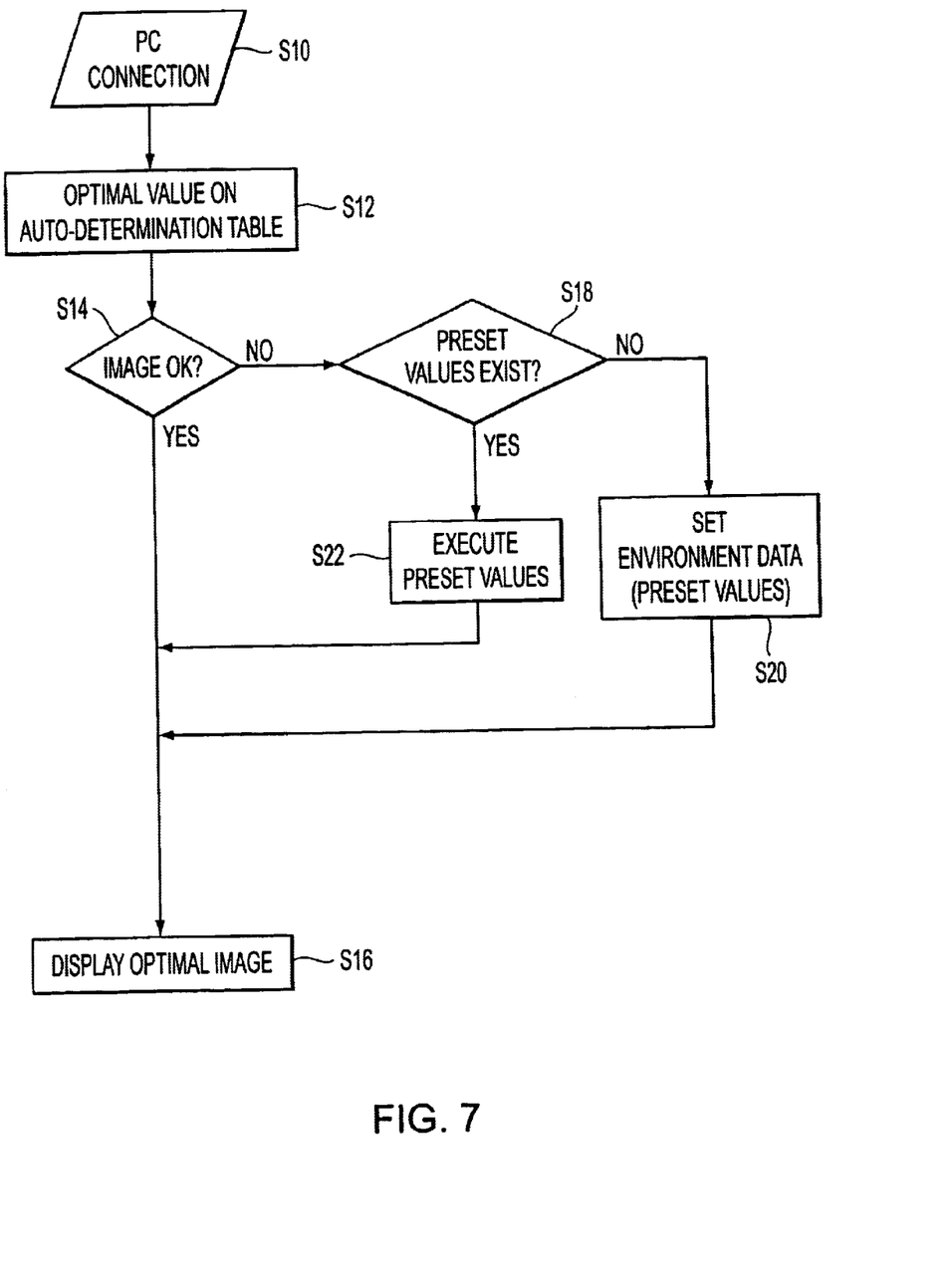
FIG. 7 is an operating flowchart of the system according to an embodiment of the present invention.

FIG. 7 shows an operation flowchart for the projector 10 according to the present embodiment.

First, a computer 30 to be used by the user is connected to the liquid crystal projector 10. Then, the start of input of analog image signals (step S10) causes the liquid crystal projector 10 to automatically determine the display mode based on the input signals, thereby performing automatic setting of the sampling parameters (step S12).

That is, stored in the liquid crystal projector 10 are basic sampling parameters (number of sampling clocks, back-porch, phase) corresponding to the resolutions of VGA, SVGA, and XGVA. The apparatus determines which resolution is the display mode based on the input analog image signal, and selects optimal sampling data, thereby starting image display (step S12).

At this time, in the event that the image displayed on the screen 20 is a clear image (step S14), the user determines this to be an optimal image and conducts image display as is (step S16).

On the other hand, in the event that the step S14 determines that the image displayed on the screen 20 is a poor image, selection of usage environment data already set to the liquid crystal projector 10 is performed (step S18).

Such usage environment data is not set when the apparatus is used for the first time. Accordingly, the menu screen is displayed on the screen 20 as described above, input and setting of the usage environment data peculiar to the user is performed so that an optimal image is displayed on the screen 20, and the preset button 74 is operated after completion of setting. Accordingly, the optimal usage environment data matching the computer 30 of the user is set in the memory 52 along with the ID thereof.

Such usage environment data can be set for the above three types, so at least three users can set usage environment data for the computers 30 which each user will use.

Next, when using the projector 10, the user presses the preset button 74 and in step S18 reads out the usage environment data which the user has set, thereby performing instruction for image reproduction using the usage environment data (steps S18, S22).

Accordingly, in using the projector for a second time and thereon, there is no need to reset the usage environment data, and a good image can be reproduced on the screen 20 from the analog image signals supplied from the computer 30.

Particularly, according to the present embodiment, not only are preset values for performing analog/digital conversion in the A/D converter 44 at the optimal timing set, but preset settings such as contrast or brightness, which reflect the user's preferences, or associated data such as preset values for the sound quality and volume, displayed color when the screen is blank, language, and so forth can all be set at the same time. Thus, an extremely easy to use liquid crystal projector 10 can be realized.

Also, though the present embodiment has been described with reference to an arrangement wherein information for selectably setting usage environment data peculiar to the user; information for storing the set usage environment data; information for selecting the stored usage environment data; and information for using the selected usage environment data upon reproducing of the image signals are stored in the memory 52 and unshown ROM, in the form of data and a projector, the present invention is by no means restricted to such an arrangement. Rather, part or all of this information may be stored in the computer 30 or in the remote controller 14.

For example, an arrangement may be employed wherein the usage environment data stored within the memory 52 is returned to the computer 30 as necessary, storing the data in the storing means of the computer 30. In this case, the usage environment data is output from the computer 30 along with the analog image signals, and the liquid crystal projector converts the analog image signals into digital signals in the same way as the above-described embodiment, thereby realizing optimal image reproduction.

Also, an arrangement may be employed wherein the usage environment data stored in the memory 52 is stored in the remote controller in the same manner, so that optimal usage environment data is sent from the remote controller 14 to the liquid crystal projector, according to the computer 30 being used. Such an arrangement exhibits the advantages of the above-described embodiment, as well.

Also, while the above embodiment has been described with reference to an example wherein the present invention is applied to a liquid crystal projector, the present invention is by no means restricted to such an arrangement, and can be used in a wide variety of applications to image reproducing apparatus wherein input analog image signals are sampled according to display pixels and are displayed, such as image reproducing apparatuses which use displays such as liquid crystal displays, plasma displays, and the like.

Also, while the above embodiment has been described with reference to an example wherein the present invention digitizes and reproduces the sampling data, but the present invention is by no means restricted to such, and the sampled analog data may be used for displaying each pixel of the image reproducing apparatus as such. For example, the arrangement may be such wherein the voltage of the sampled analog data is applied to the liquid crystal cell, thereby reproducing each pixel.

Also, though the above embodiment has been described with reference to an example wherein the present invention samples analog image signals, the present invention can also be applied to cases of sampling digital image signals. This is because even digital data encounters problems with the timing for vertical or horizontal synchronous signals, or problems with the timing relating to clock delays.

What is claimed is:

1. An image reproducing apparatus which samples input image signals, said image reproducing apparatus comprising:

storing means for storing a plurality of usage environment data respectively identifiable with a plurality of users; and selecting means for selecting stored usage environment data identified by a user, an image being reproduced based on the input image signals and the selected usage environment data, the usage environment data including sampling parameters for sampling input image signals according to display pixels.

2. An image reproducing apparatus according to claim 1, further comprising input means for input setting said usage environment data, said storing means selectably storing a plurality of input sets of the usage environment data.

3. An image reproducing apparatus according to claim 1, said usage environment data being stored with identification data identifiable by the user.

4. An image reproducing apparatus according to claim 1, said sampling parameters including a timing control sampling parameter for determining a timing for performing sampling of input image signals according to display pixels.

5. An image reproducing apparatus according to claim 1, said sampling parameters including a sampling parameter for determining at least one of contrast and brightness when performing sampling of input image signals according to display pixels.

6. An image reproducing apparatus according to claim 1, further comprising means for displaying setting data on a display, at a time of input setting of said usage environment data.

7. An image reproducing apparatus according to claim 1, further comprising a liquid crystal display, liquid shutter or plasma display, wherein the image is displayed by pixels of said liquid crystal display, liquid crystal shutter or plasma display.

8. An image reproducing apparatus according to claim 1, said input image signals being analog image signals.

9. A liquid crystal projector which samples input image signals according to said display pixels of a liquid crystal shutter based on said selected usage environment data and reproduces the input image signals as a projector image, using an image reproducing apparatus according to claim 1.

10. An image reproducing system, comprising:
   an image reproducing apparatus, including:
      storing means for storing a plurality of usage environment data respectively identifiable with a plurality of users, the usage environment data including sampling parameters for sampling input image signals according to display pixels,
      selecting means for selecting stored usage environment data identified by a user, and
      sending means for sending the selected usage environment data; and
   a computer device that stores the selected usage environment data received from the sending means, and outputs image signals and the selected usage environment data to the image reproducing apparatus,
   wherein the image reproducing apparatus reproduces an image based on the image signals and said selected usage environment data received from said computer device.

11. An image reproducing system, comprising:
   a computer device for outputting image signals;
   an image reproducing apparatus reproducing an image based on selected usage environment data identified by a user from a plurality of usage environment data respectively identifiable with a plurality of users, the usage environment data including sampling parameters for sampling input image signals according to display pixels;
   a remote controller for said image reproducing apparatus, the remote controller being arranged so as to output said selected usage environment data to said image reproducing apparatus and said image reproducing apparatus reproduces the image using said selected usage environment data output from said remote controller and the image signals; and
   storing means for inputting and setting said usage environment data when said computer device is used, and storing this data to said remote controller.

12. An information storing medium for an image reproducing apparatus which samples input image signals, said information storing medium including:
   instructions for setting a plurality of usage environment data respectively identifiable with a plurality of users, the usage environment data including sampling parameters for sampling input image signals according to display pixels;
   instructions for storing the set usage environment data;
   instructions for selecting stored usage environment data identified by a user; and
   instructions for using the input image signals and the selected usage environment data upon reproducing of said image signals.

13. An information storing medium according to claim 12, said sampling parameters including a timing control sampling parameter for determining a timing for performing sampling of input image signals according to display pixels.

14. An information storing medium according to claim 12, said input image signals being analog image signals.

15. An image reproducing method which samples input image signals, said image reproducing method comprising:
   storing a plurality of usage environment data respectively identifiable with a plurality of users, the usage environment data including sampling parameters for sampling input image signals according to display pixels; and
   selecting stored usage environment data identified by a user, an image being reproduced based on the image signals and the selected usage environment data.

16. An image reproducing method according to claim 15, further comprising input setting of said usage environment data, said storing step selectably stores a plurality of input sets of the usage environment data.

17. An image reproducing method according to claim 15, said usage environment data being stored with identification data identifiable by the user.

18. An image reproducing apparatus according to claim 15, said sampling parameters including a timing control sampling parameter for determining a timing for performing sampling of input image signals according to display pixels.

19. An image reproducing apparatus according to claim 15, said sampling parameters including a sampling parameter for determining at least one of contrast and brightness when performing sampling of input image signals according to display pixels.

20. An image reproducing method according to claim 15, further comprising displaying setting data on a display, at a time of input setting of said usage environment data.

21. An image reproducing method according to claim 15, further comprising sampling and reproducing input image signals according to display pixels of said liquid crystal display, liquid crystal shutter or plasma display, based on said selected usage environment data.

22. An image reproducing method according to claim 15, said input image signals being analog image signals.

23. An image reproducing apparatus which samples input image signals, said image reproducing apparatus comprising:

a memory that stores a plurality of usage environment data respectively identifiable with a plurality of users; and a selection unit that selects stored usage environment data identified by a user, an image being reproduced based on the input image signals and the selected usage environment data, the usage environment data including sampling parameters for sampling input image signals according to display pixels.

24. An image reproducing apparatus, comprising:

a memory that stores a plurality of usage environment data sets respectively identifiable with a plurality of users, the usage environment data including sampling parameters for sampling input image signals according to display pixels;

an operating unit that selects one of the plurality of usage environment data sets stored in the memory;

a converter that samples an input image signal in response to the selected sampling parameter set; and a display device that reproduces an image based on the sampled input image signal.

25. The image reproducing apparatus according to claim 24, further comprising a processor which outputs a sampling clock in response to the selected parameter set to the converter, the converter sampling the input image signal in synchronous with the sampling clock.

* * * * *